US011008088B2

(12) United States Patent
Dege et al.

(10) Patent No.: US 11,008,088 B2
(45) Date of Patent: May 18, 2021

(54) METHOD FOR OPERATING A WING FOR AN AIRCRAFT INCLUDING A FOLDABLE WING TIP PORTION

(71) Applicant: Airbus Operations GmbH, Hamburg (DE)

(72) Inventors: Saskia Dege, Hamburg (DE); Svenja Jegminat, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 185 days.

(21) Appl. No.: 16/193,107

(22) Filed: Nov. 16, 2018

(65) Prior Publication Data

US 2019/0152579 A1   May 23, 2019

(30) Foreign Application Priority Data

Nov. 17, 2017   (DE) .................... 10 2017 127 195.3

(51) Int. Cl.
 *B64C 3/56*   (2006.01)
(52) U.S. Cl.
 CPC ..................................... *B64C 3/56* (2013.01)
(58) Field of Classification Search
 CPC ....... B64C 3/56; B64C 23/072; B64C 23/076; B64D 45/0005; Y02T 50/30; Y02T 50/10
 See application file for complete search history.

(56) References Cited

U.S. PATENT DOCUMENTS

| 4,247,062 A | * | 1/1981 | Brueckner | ................ B64C 5/08 244/36 |
| 4,598,885 A | * | 7/1986 | Waitzman | ............. B64C 23/076 244/13 |
| 4,671,473 A | * | 6/1987 | Goodson | ............... B64C 23/076 244/199.4 |
| 5,381,986 A | * | 1/1995 | Smith | ...................... B64C 3/56 244/49 |

(Continued)

FOREIGN PATENT DOCUMENTS

| EP | 2 727 829 | 5/2014 |
| EP | 3 000 723 | 3/2016 |

OTHER PUBLICATIONS

European Search Report cited in EP 18204553.4 dated Feb. 21, 2019, 6 pages.

(Continued)

*Primary Examiner* — Medhat Badawi
(74) *Attorney, Agent, or Firm* — Nixon & Vanderhye P.C.

(57) ABSTRACT

A method for operating a wing (5) including a fixed wing (9), a foldable wing tip portion (11) mounted to the fixed wing (9) pivotally between an extended position and a folded position, an actuation unit (13) for actuating movement of the foldable wing tip portion (11), and an arresting unit (15) for locking the foldable wing tip portion (11) in the extended position and/or in the folded position. The method includes controlling the actuation unit (13) to move the foldable wing tip portion (11) either to the extended position or to the folded position until the foldable wing tip portion (Continued)

(11) or the actuation unit (13) contacts a stop element (28), continuing actuation until the actuation unit (13) reaches a stall condition, detecting the stall condition of the actuation unit (13), and locking the arresting unit (15) upon detection of the stall condition.

12 Claims, 2 Drawing Sheets

(56) References Cited

U.S. PATENT DOCUMENTS

| | | | | |
|---|---|---|---|---|
| 5,988,563 | A * | 11/1999 | Allen | B64C 3/56 |
| | | | | 244/49 |
| 9,517,834 | B2 * | 12/2016 | Thompson | B64C 3/56 |
| 10,147,244 | B2 * | 12/2018 | Atalla | G01P 5/16 |
| 2014/0014768 | A1 * | 1/2014 | Lassen | B64C 3/56 |
| | | | | 244/49 |
| 2015/0014478 | A1 * | 1/2015 | Lassen | B64C 3/56 |
| | | | | 244/49 |
| 2015/0108283 | A1 * | 4/2015 | Thoreen | B64C 9/00 |
| | | | | 244/234 |
| 2015/0210390 | A1 * | 7/2015 | Gad | B64D 1/12 |
| | | | | 244/137.3 |
| 2016/0244146 | A1 * | 8/2016 | Harding | B64C 3/56 |
| 2017/0247105 | A1 * | 8/2017 | Heller | B64C 23/065 |
| 2018/0170518 | A1 * | 6/2018 | Niemiec | B64C 3/56 |
| 2019/0152578 | A1 * | 5/2019 | Dege | B64C 3/56 |
| 2019/0152579 | A1 * | 5/2019 | Dege | B64C 3/56 |
| 2019/0152580 | A1 * | 5/2019 | Dege | B64C 23/069 |
| 2019/0152624 | A1 * | 5/2019 | Dege | B64C 3/56 |
| 2019/0367154 | A1 * | 12/2019 | Weder | B64C 3/56 |
| 2019/0367155 | A1 * | 12/2019 | Dege | B64C 3/56 |
| 2020/0023938 | A1 * | 1/2020 | Dege | B64C 3/56 |

OTHER PUBLICATIONS

Search Report for DE102017127195.3, dated Aug. 29, 2018, 7 pages.

* cited by examiner

METHOD FOR OPERATING A WING FOR AN AIRCRAFT INCLUDING A FOLDABLE WING TIP PORTION

RELATED APPLICATION

This application claims priority to German Patent Application No. 10 2017 127 195.3, filed Nov. 17, 2017, the entirety of which is incorporated by reference.

FIELD

The present invention relates to a method for operating a wing for an aircraft including a foldable wing tip portion. In particular the method is for operating locking of the foldable wing tip portion in an extended position and/or in a folded position.

BACKGROUND

Foldable wings comprise a fixed wing and a foldable wing tip portion mounted to the fixed wing in a foldable manner. The foldable wing tip portion may pivot either upwards or sideways or rearwards. To be folded upwards, the foldable wing tip portion may pivot about an axis extending in a horizontal plane and/or in parallel to a wing chord direction and/or in parallel to the wing surface and/or in a flight direction. To be folded sideways, the foldable wing tip portion may pivot about a vertical axis and/or about an axis in parallel to a wing thickness direction and/or about an axis normal to a plane spanned by the wing chord direction and a wing span direction.

Foldable wings reduce the space requirements of an aircraft during maneuver and parking on ground. The space requirements may be the distance wing tip to wing tip, e.g., span, taken up by the aircraft on the ground. During flight the foldable wing tip portions are locked in an extended position. After the aircraft has landed, the foldable wing tip portions are folded to reducing the overall span of the aircraft.

An arresting unit in the wing locks the foldable wing tip portions in their extended and/or folded positions. The arresting unit is a structural component of the wing and typically must carry the full load of the aerodynamic forces acting on the foldable wing tip portion during flight. Because the arresting unit must carry these loads, engaging parts of the arresting unit are formed with small tolerances. Because of the small tolerances, precise alignment of the engaging parts is required to bring them into engagement and the arresting unit can locked in the extended and/or folded positions.

SUMMARY

There is a need for an improved and simplified method to lock an arresting unit. A method has been conceived and is disclosed herein for operating a wing.

The wing may include a fixed wing, a foldable wing tip portion, an actuation unit and an arresting unit. The fixed wing extends between a root end at the fuselage and a tip end which faces an end of the foldable wing tip portion. The foldable wing tip portion is pivotably mounted to the tip end of the fixed wing. The foldable wing tip may pivot about an axis of rotation between an extended position, i.e. a flight position, and a folded position, i.e. a ground position. In the extended position, the foldable wing tip portion extends in a wing span direction as an extension of the fixed wing. In the folded position, the foldable wing tip portion is folded at an angle to the wing span direction. The axis of rotation may extend in a wing chord direction or in a wing thickness direction.

The actuation unit may include a motor, e.g. an electric motor combined with a gear box. The actuation unit may be configured for actuating movement of the foldable wing tip portion between the extended position and the folded position.

The arresting unit is configured for locking the foldable wing tip portion in the extended position and/or in the folded position. The arresting unit may carry the aerodynamic load of the foldable wing tip portion during flight.

The method includes, controlling, e.g., commanding or activating, the actuation unit to move the foldable wing tip portion to the extended position or to the folded position until the foldable wing tip portion or the actuation unit contacts a stop element. The stop element may be part of the actuation unit or of the structure of the fixed wing. Controlling may be performed by a control unit.

The actuation unit continues moving the foldable wing tip portion until the actuation unit reaches a stall condition. Continuing actuation means specifically continuing commanding the actuation unit to move, and reaching a stall condition means that the actuation unit applies a torque but does not move.

The stall condition of the actuation unit may be detected by a stall sensor or stall monitor. The stall sensor may be part of the control unit or of a separate motor control. The term stall sensor means a stall monitor that detects more than one parameter that indicates a stall condition, evaluate the parameters and declare a stall condition based on the evaluation of the parameters.

Upon detection of the stall condition, the arresting unit is locked. The locking of the arresting unit includes bringing the arresting unit into a locked position at which the foldable wing tip portion is locked in the extended position and/or in the folded position.

Detecting of the stall condition is a simple and precise way to determine if the engaging parts of the arresting unit are aligned and ready for engagement. This method may be used to quickly and reliably confirm that an arresting unit is lock, despite the small tolerances of the engagement parts in an arresting unit.

The stall condition may require that over a predefined time period the actuation unit receives a control command to move, such as from the control unit, but does not actually move and thus the actuation unit has a velocity equals zero. Detecting that the actuation unit does not move over a predetermined time period may be reliably and easily detected. Alternatively or additionally, the stall condition may be detected by determining that over a predefined time period whether there is a certain electrical current or a certain hydraulic flow in the actuation unit. The hydraulic flow could be detected by measuring an angle of a swash plate.

The arresting unit may include: a latching device, preferably a plurality of latching devices. The latching device comprises a first latching part mounted to the fixed wing and a second latching part mounted to the foldable wing tip portion. One of the first and second latching parts might e.g. comprise a bolt while the other one of the first and second latching parts might comprise a corresponding hole or recess adapted for engagement with the bolt. First and second latching parts can be moved relative to one another between a latched position, where first and second latching parts are engaged and the foldable wing tip portion is locked in the extended position and/or in the folded position, and an unlatched position, where first and second latching parts are disengaged so that the foldable wing tip portion is movable out of the extended position and/or folded position. Locking the arresting unit requires engaging the first and second latching parts, i.e. bringing first and second latching parts in the latched position. Preferably, the arresting unit further comprises a locking device for securing the latching parts in the latched position. This represents a simple and reliable construction of the arresting unit.

The actuation unit may be configured such that the load applied by the actuation unit when the stall condition is reached corresponds to a load that is required to bring first and second latching parts into alignment for engagement. The load applied by the actuation unit when the stall condition is reached is high enough to press the foldable wing tip portion or the actuation unit against the stop element until alignment of the latching parts is reached and the latching parts can be engaged.

The invention may be embodied in an aircraft comprising a fuselage, wings mounted to the fuselage, and a control unit. Each wing is formed as described above in connection with the method, comprising a fixed wing, a foldable wing tip portion, an actuation unit, and an arresting unit. The fixed wing extends between a root end and a tip end. The foldable wing tip portion is mounted to the tip end of the fixed wing pivotally about an axis of rotation between an extended position and a folded position. In the extended position, the foldable wing tip portion extends in a wing span direction as an extension of the fixed wing, wherein in the folded position the foldable wing tip portion is folded away and extends under an angle with respect to the wing span direction. The axis of rotation extends either in a wing chord direction or in a wing thickness direction. The actuation unit is configured for actuating movement of the foldable wing tip portion between the extended position and the folded position. The arresting unit is configured for locking the foldable wing tip portion in the extended position and/or in the folded position. The control unit is configured for controlling the aircraft to carry out the method according to any of the afore-described embodiments. In particular, the control unit is configured for controlling the actuation unit to move the foldable wing tip portion either to the extended position or to the folded position until the foldable wing tip portion or the actuation unit contacts a stop element, continuing commanding actuation until the actuation unit reaches a stall condition, detecting the stall condition of the actuation unit, and locking the arresting unit upon detection of the stall condition.

The control unit may include a stall sensor configured to detect the stall condition when over a predefined time period the actuation unit receives a control command to move but does not actually move, such as when the actuation unit has a zero velocity. The stall sensor may be part of the control unit or of a separate motor control. The control unit is configured to reliably and easily detect a stall condition.

The arresting unit may include a latching device(s), each of which includes a first latching part mounted to the fixed wing and a second latching part mounted to the foldable wing tip portion. One of the first and second latching parts may be a bolt while the other one of the first and second latching parts may be a corresponding hole or recess adapted for engagement with the bolt. The first and second latching parts may be moved relative to one another between a: (i) latched position, where first and second latching parts are engaged and the foldable wing tip portion is locked in the extended position and/or in the folded position, and (ii) an unlatched position, where first and second latching parts are disengaged so that the foldable wing tip portion is movable out of the extended position and/or folded position. Locking the arresting unit includes engaging the first and second latching parts such as by bringing the first and second latching parts together to form a latched configuration. The arresting unit may further comprises a locking device for securing the latching parts in the latched position.

The actuation unit may be configured such that the load applied by the actuation unit when the stall condition is reached corresponds to a load that is required to bring first and second latching parts into alignment for engagement. The load applied by the actuation unit when the stall condition is reached should be great enough to press the foldable wing tip portion or the actuation unit against the stop element until alignment of the latching parts is reached and the latching parts can be engaged.

DRAWINGS

The drawings shown an embodiment of the invention. The drawings include:

DETAILED DESCRIPTION

Figure 1:
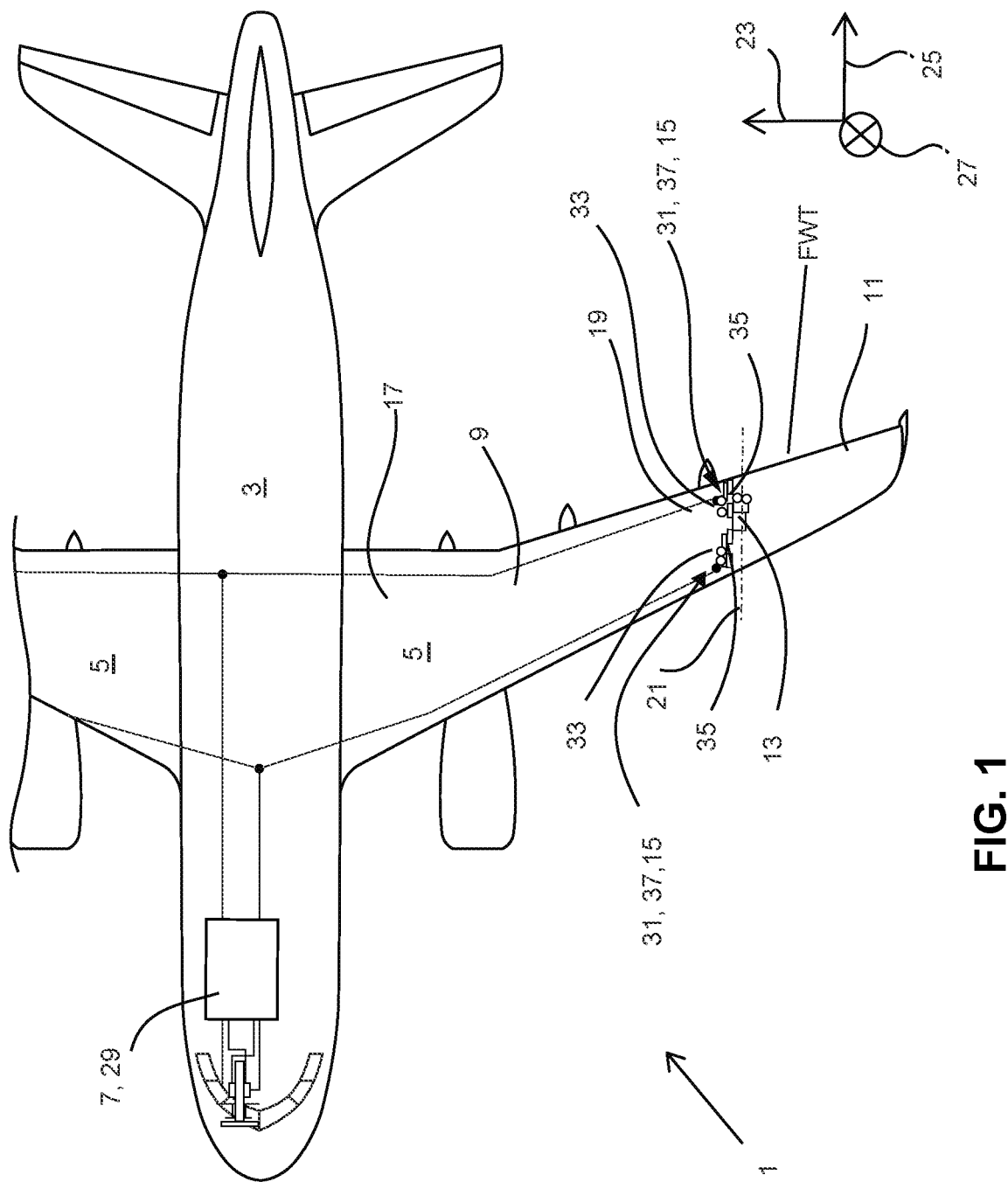
FIG. 1 shows a top view of an aircraft according to the invention.

In FIG. 1, an aircraft 1 including a fuselage 3, wings 5 mounted to the fuselage 3, and a control unit 7. Each wing 5 includes a fixed wing 9, a foldable wing tip portion 11, an actuation unit 13, and an arresting unit 15. The fixed wing 9 extends between a root end 17 at the fuselage, and a tip end 19 which faces the foldable wing tip portion. The foldable wing tip portion 11 is pivotably mounted to the tip end 19 of the fixed wing 9 and pivots about an axis of rotation 21 between an extended position and a folded position. In the extended position, the foldable wing tip portion 11 extends in a wing span direction 23 as an extension of the fixed wing 9, wherein in the folded position the foldable wing tip portion 11 is folded away and extends under an angle with respect to the wing span direction 23. The axis of rotation 21 extends in a wing chord direction 25, but in other embodiments might also extend in a wing thickness direction 27.

The actuation unit 13 is configured for actuating movement of the foldable wing tip portion 11 between the extended position and the folded position. The arresting unit 15 is configured for locking the foldable wing tip portion 11 in the extended position and/or in the folded position. The control unit 7 is configured for controlling the aircraft 1 to carry out the following method for operating the wing 5:

First, the control unit 7 controls the actuation unit 13 to move the foldable wing tip portion 11 to the extended position or to the folded position, until the foldable wing tip portion 11 contacts a stop element 28 mounted to the structure of the fixed wing 9. Actuation is continued until the actuation unit 13 reaches a stall condition. The stall condition requires that over a predefined time period the actuation unit 13 receives a control command to move from the control unit 7, but does not actually move. The stall condition of the actuation unit 13 is detected by a stall sensor 29 included in the control unit 7. Upon detection of the stall condition, the arresting unit 15 is locked, so that the foldable wing tip portion 11 is locked in the respective extended position or folded position.

Figure 2A:
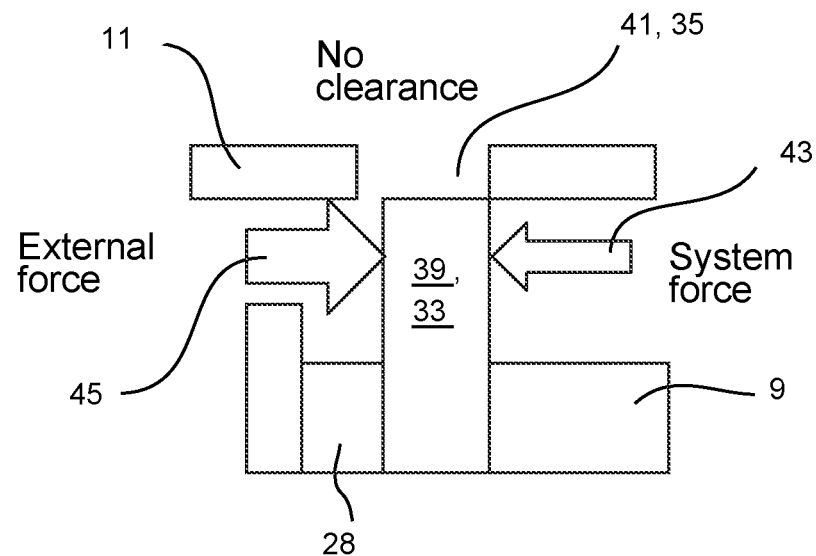
FIGS. 2A and 2B shows a schematic illustration of the arresting unit with latching parts out of and in alignment.
Figure 2B:
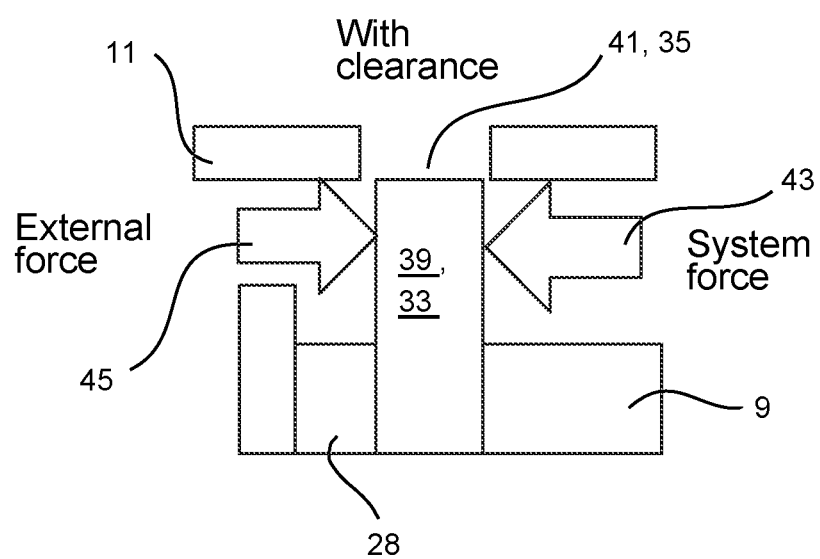

The arresting unit 15 comprises a plurality of latching devices 31. Each latching device 31 comprises a first latching part 33 mounted to the fixed wing 9 and a second latching part 35 mounted to the foldable wing tip portion 11. First and second latching parts 33, 35 can be moved relative to one another between a latched position, where first and second latching parts 33, 35 are engaged and the foldable wing tip portion 11 is locked in the respective extended position or folded position, and an unlatched position, where first and second latching parts 33, 35 are disengaged so that the foldable wing tip portion 11 is movable out of the respective extended position or folded position. Locking the arresting unit 15 requires engaging the first and second latching parts 33, 35, i.e. bringing first and second latching parts 33, 35 in the latched position. As shown in FIGS. 2a and 2b, the first latching part 33 comprises a bolt 39 and the second latching part 35 comprises a corresponding hole 41 adapted for engagement with the bolt 39. The latching devices 31 are controlled and movable independently from one another between the latched position and the unlatched position. The arresting unit 15 further comprises a plurality of locking devices 37 for securing first and second latching parts 33, 35 in the latched position.

As illustrated in FIGS. 2a and 2b, a certain load 43 applied by the actuation unit 13 is required to bring first and second latching parts 33, 35 into alignment for engagement against external forces 45 including weight, drag, air loads and elastic restoring forces. FIG. 2a illustrates that no alignment and thus no engagement between bolt 39 and hole 41 is possible if the load applied by the actuation unit 13 is lower as the external forces 45. However, according to the invention, as shown in FIG. 2b, the actuation unit 13 is configured such that the load 43 applied by the actuation 13 unit when the stall condition is reached corresponds to a load that is required to bring first and second latching parts 33, 35 into alignment for engagement. The load applied by the actuation unit 13 when the stall condition is reached should be great enough to press the foldable wing tip portion 11 against the stop element 28 until alignment of the latching parts 33, 35 is reached and the latching parts 33, 35 are engaged.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for operating a wing for an aircraft, wherein the wing includes a fixed wing, a foldable wing tip portion pivotably mounted to the fixed wing about an axis of rotation between an extended position and a folded position, an actuation unit configured to actuate movement of the foldable wing tip portion between the extended position and the folded position, and an arresting unit configured to lock the foldable wing tip portion in the extended position and/or in the folded position, wherein the method includes:

controlling the actuation unit to move the foldable wing tip portion to the extended position or to the folded position until the foldable wing tip portion or the actuation unit contacts a stop element;

continuing the movement of the foldable wing tip portion to the extended position or to the folded position by the actuation due to the controlling of the actuation unit until the actuation unit stalls;

detecting the stall of the actuation unit, wherein the detection of the stall includes determining over a certain period that at least one of the actuation unit and the foldable wing tip portion does not move while the actuation unit actuates a control command to move the wing tip portion, and locking the arresting unit in response to the detection of the stall.

2. The method according to claim 1, wherein the arresting unit comprises a latching device including a first latching part mounted to the fixed wing, and a second latching part mounted to the foldable wing tip portion;

wherein first and second latching parts move relative to one another between a latched position, where first and second latching parts are engaged the lock the foldable wing tip portion in the extended position and/or in the folded position, and an unlatched position, where the first and second latching parts are disengaged to allow the foldable wing tip portion to pivot, and wherein locking the arresting unit is configured to required engagement of the first and second latching parts to lock.

3. The method according to claim 2, wherein the actuation unit is configured such that a load applied by the actuation unit when stalled corresponds to a load required to bring first and second latching parts into alignment.

4. An aircraft comprising:

a fuselage, wings mounted to the fuselage, and a control unit, wherein each wing comprises a fixed wing, a foldable wing tip portion, an actuation unit, and an arresting unit, wherein the foldable wing tip portion is pivotably mounted to the fixed wing to pivot about an axis of rotation between an extended position and a folded position, wherein the actuation unit is configured to actuate movement of the foldable wing tip portion between the extended position and the folded position, wherein the arresting unit is configured to lock the foldable wing tip portion in the extended position and/or in the folded position, and wherein the control unit is configured for:

controlling the actuation unit to move the foldable wing tip portion to the extended position or to the folded position until the foldable wing tip portion or the actuation unit reaches the extended position or the folded position and contacts a stop element;

continuing the controlling of the actuation unit to move the foldable wing tip portion until and for a period after the actuation until stalls;

detecting the stall of the actuation unit, wherein the detection of the stall includes determining over a certain period that at least one of the actuation unit and the foldable wing tip portion does not move while the actuation unit actuates a control command to move the wing tip portion, and locking the arresting unit in response to the detection of the stall condition.

5. The aircraft according to claim 4, wherein the control unit comprises a stall sensor configured to detect the stall by determining that the actuation unit, while subject to a command to move, does not move over a certain period.

6. The aircraft according to claim 4, wherein the arresting unit comprises a latching device that includes a first latching part mounted to the fixed wing and a second latching part mounted to the foldable wing tip portion,
   wherein first and second latching parts move relative to one another between:
   (i) a latched position in which the first and second latching parts are engaged to lock the foldable wing tip portion in the extended position and/or in the folded position, and
   (ii) an unlatched position in which the first and second latching parts are disengaged and the foldable wing tip portion is movable out of the extended position and/or folded position, and
   wherein locking the arresting unit includes engagement of the first and second latching parts.

7. The aircraft according to claim 4, wherein the actuation unit is configured to apply a load to bring the first and second latching parts into alignment.

8. A method for operating a foldable wing which includes a fixed wing, a foldable wing tip device pivotably mounted to the fixed wing, an actuation unit configured to pivot the foldable wing tip device, and an arresting unit configured to lock the foldable wing tip portion in an extended position, wherein the method includes:
   actuating the actuation unit to move the foldable wing tip device to the extended position and until the foldable wing tip device or the actuation unit abuts a stop element while the foldable wing tip device is at the extended position;
   continuing the actuation of the actuation unit after the abutment with the stop element and after the actuation unit stalls due to the abutment;
   detecting the stall of the actuation unit, wherein the detection of the stall includes determining over a certain period that at least one of the actuation unit and the foldable wing tip portion does not move while the actuation unit actuates a control command to move the wing tip portion, and
   locking the arresting unit in response to the detection of the stall.

9. The method according to claim 8, wherein the detection of the stall included determining that the actuation does not move while applying to the actuation movement a command to move.

10. The method of claim 9 wherein the determination includes determining that the actuation unit did not move during a certain period while the actuation unit is subject to the command to move.

11. The method according to claim 8, wherein the arresting unit comprises a latching device including a first latching part mounted to the fixed wing, and a second latching part mounted to the foldable wing tip device,
   wherein first and second latching parts move relative to one another between a latched position and an unlatched position, and
   wherein locking the arresting unit includes the locking of the first and second latching parts.

12. The method according to claim 11, further comprising the actuation unit applying a load to pivot the wing tip device to move the first and second latching parts into alignment for locking the first and second latching parts.

* * * * *